United States Patent [19]  
Humphrey

[11] 4,043,644  
[45] Aug. 23, 1977

[54] ELASTICALLY COMPENSATED OFF-AXIS MIRROR

[75] Inventor: William E. Humphrey, Orinda, Calif.

[73] Assignee: Humphrey Instruments, Inc., San Leandro, Calif.

[21] Appl. No.: 705,655

[22] Filed: July 15, 1976

[51] Int. Cl.² .............................................. G02B 5/10
[52] U.S. Cl. .................................................... 350/295
[58] Field of Search ............... 350/293, 295, 296, 310, 350/320

[56] References Cited

U.S. PATENT DOCUMENTS

| 408,511 | 8/1889 | O'Brien | 350/295 X |
|---|---|---|---|
| 2,733,637 | 2/1956 | Joseph | 350/295 |
| 3,521,943 | 7/1970 | Kelderman | 350/295 X |

Primary Examiner—F. L. Evans  
Attorney, Agent, or Firm—Townsend and Townsend

[57] ABSTRACT

A reflecting mirror with an active optical surface approximating a sphere is elastically deformed for off-axis use. The mirror, preferably symmetrical about an axis normal to its center point, is circular in peripheral configuration. The active optical surface is ground on a circular face of the mirror. This surface can be ground to be equal to or to exceed the F-stop of 2.5. The mirror has a thickness at its central point in the range of one fifth to one fifteenth of its diameter, with a thickness of one tenth of the diameter being preferred. The reverse and non-optically active side of the mirror is provided with a curvature in anticipation of its elastic deformation for off-axis use. This reverse curvature is a spherical surface having a different radius of curvature complementary to the curvature of the active optical surface. This different radius of curvature is chosen so that the decrease in mirror thickness at the mirror edge compared to the thickness at the mirror center is in the preferred range of 0.33. An intermediate ratio in the range of 0.27 to 0.39 and a broad ratio in the range of 0.21 to 0.42 are disclosed. A harness for bending the mirror in an adjustably reproducible and elastic manner is described as well as the support for holding the mirror when it is bent for off-axis use.

13 Claims, 6 Drawing Figures

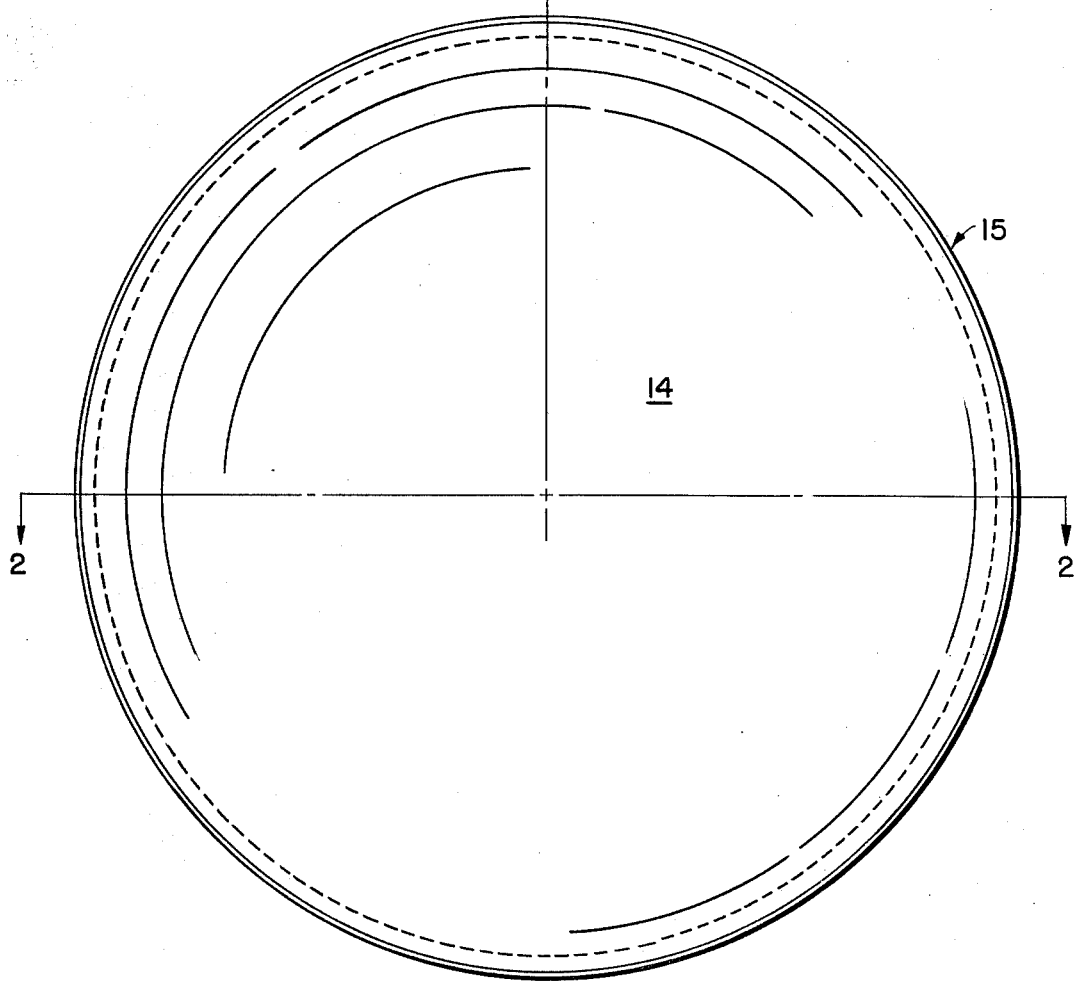
FIG._2.
FIG._1.

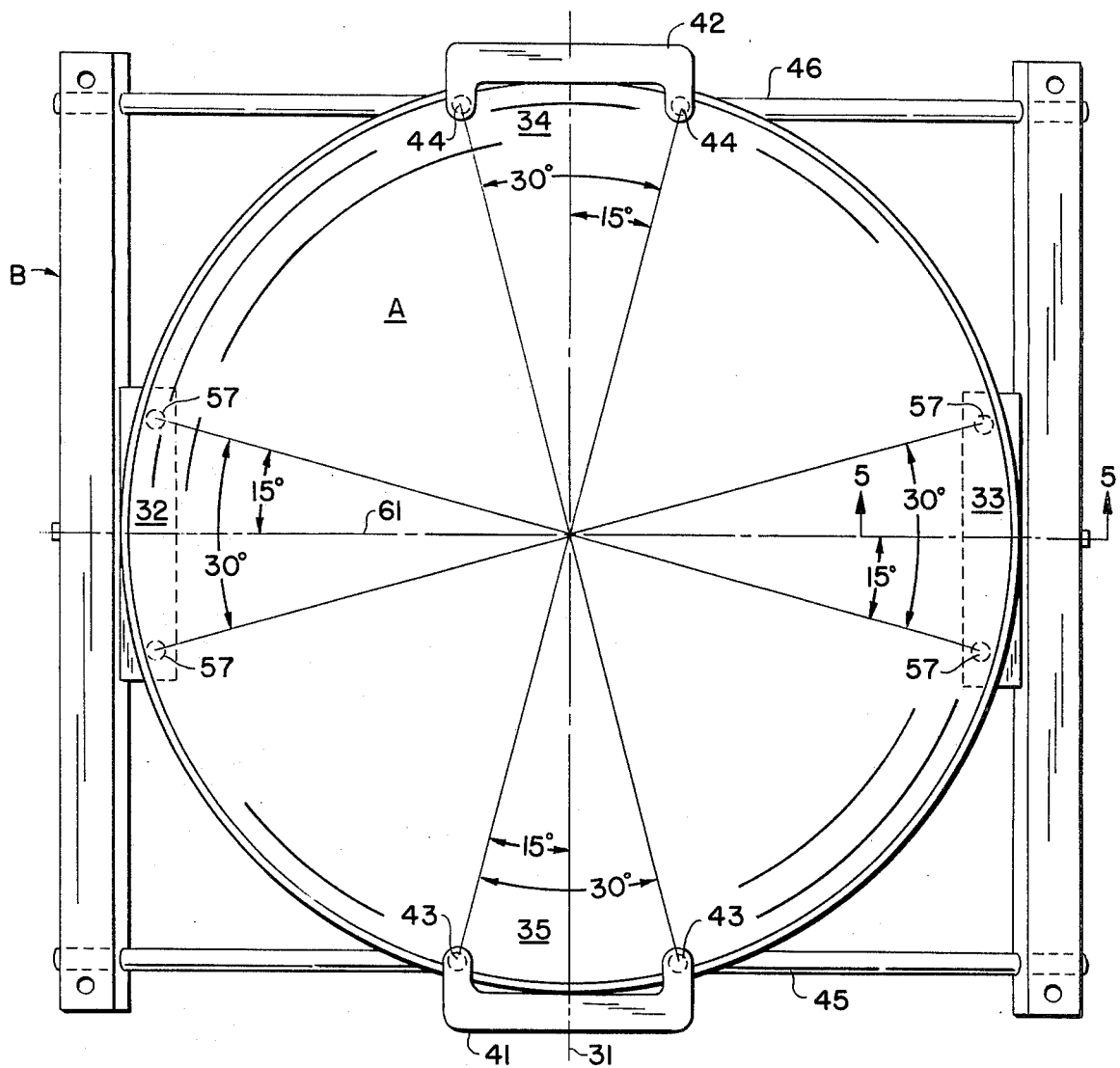
FIG._3.
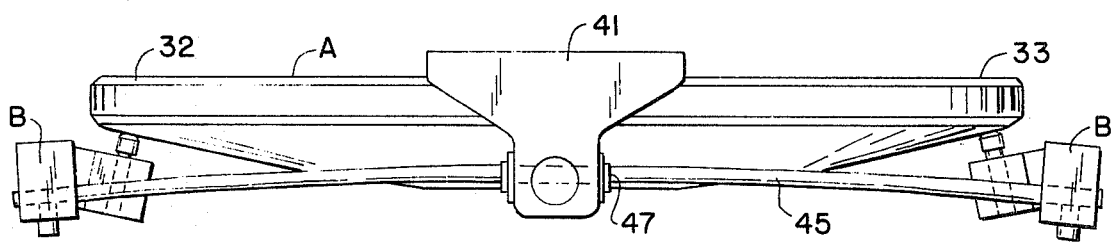
FIG._4.

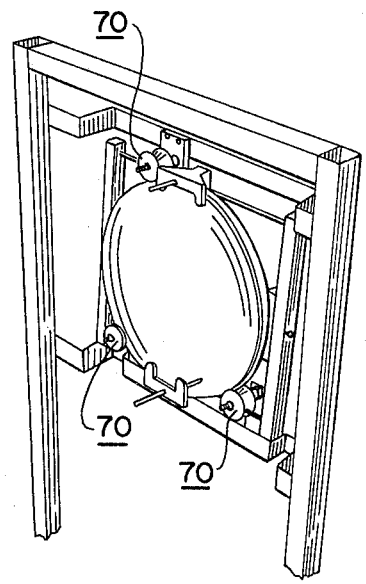
FIG._6.
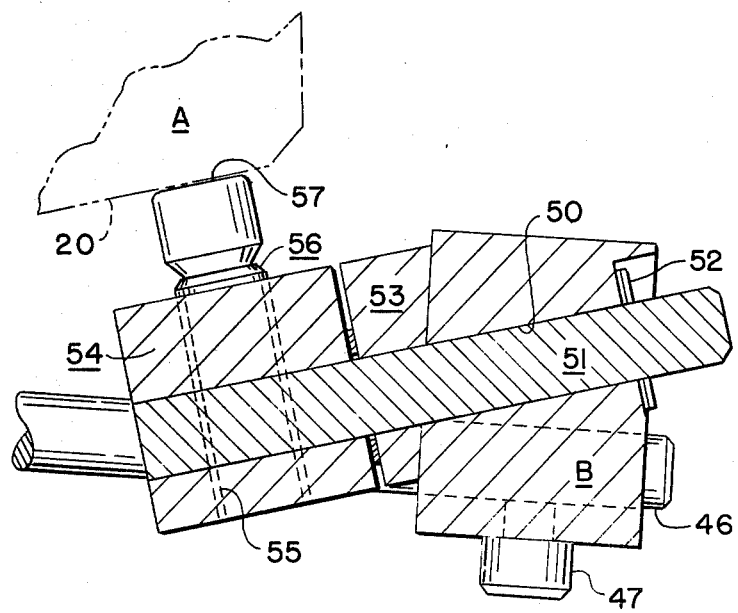
FIG._5.

ELASTICALLY COMPENSATED OFF-AXIS MIRROR

This invention relates to off-axis optical reflective mirrors and specifically to an off-axis mirror which is elastically deformed.

SUMMARY OF THE PRIOR ART

Off-axis mirrors are known. Typically, they are found in reflecting optics such as telescopes and the like where optical trains require folded optical paths that are off-axis.

The grinding of active optical surfaces to accommodate off-axis optics is a problem of great technical complexity. This problem results from the fact that such mirrors cannot have a central axis of symmetry normal to the mirror surface such as the axis of symmetry common in spheres and parabolas. That is to say, the off-axis mirrors comprise a toric surface which is not symmetrical about any axis substantially normal to the plane of the mirror. Thus, such mirrors are typically ground by oriented laps having carefully controlled strokes to generate their toric surface.

The reproducibility of such off-axis mirrors is a very difficult technical problem. Where in a mass production item an off-axis mirror is required, specially ground off-axis surfaces are very hard to duplicate. Typically, the optical paths are adjusted to accommodate the particular focal length of mirror rather than the mirror being ground on an off-axis basis to accommodate a highly accurate focal length.

The off-axis grinding problem becomes especially acute where the mirror is used in a high off-axis mode — in a range up to 5° on either side of the optic axis. Thus, where the angular difference of the axis of incident light from the axis of reflected light exceeds 10°, grinding problems related to off-axis surfaces are acute. Moreover, where the mirror has low F-numbers approaching F2.5, the grinding of the off-axis surface is again an acute technical problem.

Elastically deformed mirrors are known. Typically, the toric shapes are provided by bending the mirrors in small ranges. Usually, the F-number of the mirror is quite high (in the range above F8) and the off-axis use of the mirror is quite small (in the range of 1° or less). Even so, optical aberrations result. Typically, the center of the mirror is deflected too much. The edges are deflected too little. An aberration results.

SUMMARY OF THE INVENTION

A reflecting mirror with an active optical surface approximating a sphere is elastically deformed for off-axis use. The mirror, preferably symmetrical about an axis normal to its center point, is circular in peripheral configuration. The active optical surface is ground on a circular face of the mirror. This surface can be ground to be equal to or to exceed the F-stop of 2.5. The mirror has a thickness at its central point in the range of one fifth to one fifteenth of its diameter, with a thickness of one tenth of the diameter being preferred. The reverse and non-optically active side of the mirror is provided with a curvature in anticipation of its elastic deformation for off-axis use. This curvature is a spherical surface having a different radius of curvature complementary to the active optical surface of the mirror. This different radius of curvature is chosen so that the decrease in mirror thickness at the mirror edge compared to the thickness at the mirror center is in the preferred range of 0.33. An intermediate ratio in the range of 0.27 to 0.39 and a broad ratio in the range of 0.21 to 0.42 are disclosed. A harness for bending the mirror in an adjustably reproducible and elastic manner is described as well as the support for holding the mirror when it is bent for off-axis use.

OBJECTS AND ADVANTAGES OF THE INVENTION

An object of this invention is to disclose the parameters for fabrication of an elastically deformable mirror. According to this aspect of the invention, a mirror having a substantially spherical optical surface is ground. The reverse surface which is non-optically active is also ground. This reverse surface has a different radius of curvature. This radius of curvature is selected so that the thickness of the mirror at its edge is reduced by a factor of 0.33 from that at the center.

An advantage of the mirror is that the elastic properties of the mirror along an axis chosen for deflection are such that the optical properties of the mirror are preserved when elastic deflection for off-axis use up to 5° occurs.

Yet another advantage of the mirror is that when it is elastically deflected, aberrations common to bending of such mirrors are vastly reduced.

Yet another advantage of this invention is that mirrors with F-numbers as low as 2.5 can be elastically deformed.

An advantage of a mirror having the aforementioned parameters is that the great technical problem of off-axis grinding of the toric surface is completely avoided.

Yet another object of this invention is to disclose the thickness of such a mirror which can be elastically deformed. Typically, the central thickness of the mirror must be in the range of one fifth to one fifteenth the total diameter of the mirror.

Yet another object of this invention is to disclose the range of change of edge thickness to the change of center thickness which, with elastic deformation, will produce optically tolerable results. This range is chosen so that the decrease in mirror thickness at the mirror edge, when compared to the thickness of the mirror at the mirror center, is in the intermediate range of 0.27 to 0.39, and in the broad range of 0.21 to 0.42.

An advantage of utilization of optics within the given ranges is that they can produce optically tolerable results. Dependent upon the active optical application of a mirror, relatively wide optical tolerances can be used with the reverse non-active surface of the mirror.

Yet another advantage of this aspect of the invention is that the accuracy and attention given to the reverse surface grinding can vary within wide limits.

Yet another advantage of the invention is that the warping of the mirror herein disclosed can apply either to a concave or a convex optical surface.

Yet another object of this invention is to disclose an elastic deformation harness which, when coupled to the disclosed mirror, can give the desired off-axis bending. According to this aspect of the invention, a harness having pressure points distributed about X and Y axes intersects with the outer diameter of the mirror as disclosed. Specifically, pressure points are located at 15° either side of the X-axis, and 15° either side of the Y-axis. By providing the harness deflecting members with wide deflections, a uniform bending of a mirror results.

An advantage of the pressure point distribution of the harness of this invention is that adjustment can be made by reasonably remembered symmetrical movement of all of the pressure points together. Precise movement of one pressure point with respect to all of the other pressure points is not required to produce an off-axis mirror with a toric surface having a high degree of off-axis accuracy.

Yet another advantage of this harness is that simple elastic adjustment gives a high degree of accuracy with simply reproducible results. Thus, a mirror may be symmetrically ground with a high degree of reproducibility and thereafter elastically deformed for off-axis use. This elastic deformation again has a high degree of reproducibility.

Yet another advantage of the elastic deformation harness of this invention is that field warping of an off-axis mirror can easily occur. The harness can be accurately adjusted on the mirror working site to produce a precise and even astronomically perfect mirror for off-axis use.

Yet another object of this invention is to disclose a holding means for an elastically deformed off-axis mirror. According to this aspect, the mirror is mounted at its edge to three holding wheels spaced at intervals about the mirror periphery.

An advantage of this aspect is that holding of the mirror does not impart appreciable elasticity to deform it with forces other than those applied by the harness.

Other objects, features and advantages of this invention will become more apparent after referring to the following specification and attached drawings in which:

FIG. 1 is a plan view of the optically active surface of the mirror;

Fig. 2 is a side elevation section of the mirror of FIG. 1 taken along lines 2—2;

FIG. 3 is a mirror of FIG. 1 with a warping harness elastically imparting an off-axis deflection to the mirror of FIG. 1;

FIG. 4 is a side elevation view of the mirror and harness of FIG. 3;

FIG. 5 is a side elevation section of the pressure point apparatus of FIG. 3 is an enlarged section taken along lines 5—5 of FIG. 3; and, FIG. 6 is a perspective view of the torque mirror and harness being held for use in an apparatus for testing of the eyes.

Referring to FIG. 1, a mirror having an active optical surface 14 is illustrated. The mirror is circular in shape bounded by a circular periphery 15 and has traditional optical chamfers 16, 17 at its edges. Optically active surface 14 is "substantially spherical", a term which will hereinafter be described with respect to the curvature applied to the reverse or non-optically active surface of the mirror.

As can be seen, the reversed surface of the mirror here illustrated is rough ground to a radius of curvature less than that provided at optical surface 14. This surface 20 is rough ground, optically speaking, preferably of diamond generator quality.

The mirror here illustrated is slightly less than one tenth as thick at 21 as its total diameter. Moreover, the radius of curvature of the active optical surface 14 is 300 centimeters in a 12.5 inch diameter mirror. The radius of curvature of surface 20 is 100 centimeters. There is a ratio of a decrease in thickness at side 22 from that at center 21 so that the thickness of the mirror at dimension 22 constitutes the thickness at 21 minus 0.33 times the thickness at 21.

It should be noted that referring to FIG. 2, the mirror is symmetrical about an optical axis 24. Thus, when it is fabricated, both surfaces 14 and 20 are concentric with respect to the axis 24 and can be made with conventional optical tooling.

It should be understood that the types of glass used in the fabrication of the mirror can vary within wide limits. Since the warping forces applied to the mirror vary as the cube of the thickness, various types of optical glass can be used as long as they have sufficient strength to sustain the warping forces. Additionally, other materials such as metals may be employed as warped mirrors provided they have elastic behavior and are sufficiently strong to not yield under the influence of the warping forces.

It should be understood that the thickness of the mirror at 21 with respect to its diameter can vary from 5:1 to 15:1, with 10:1 being preferred. With 15:1, it has been found that the glass is so thin that with the application of pressure at preselected points through the mirror, the glass is caused to optically deform at optically active surface 14. Irregularities in the image result. Where the mirror is thick and beyond a 5:1 ratio, the internal stresses in the mirror can be too much. Cracking of a mirror can result.

Regarding the term "substantially spherical", it has been found that where the optical surfaces are near spherical, torquing of the mirror in accordance with this invention can result. However, where the overall departure from sphericity of the mirror exceeds 10% of the change of mirror thickness at the edge, torquing of such mirrors will depart from the scope of this invention. That is to say, the departure of the active optical surface 14 from that of the "substantially spherical" exceeds the limit.

It has been found that the parameter best describing the optimum mirror configuration is $\Delta/t$; where $\Delta$ is the change in mirror thickness from center to edge; and $t$ is the mirror thickness at the edge.

Having fully set forth the parameters related to the construction of the mirror, the details of harness assembly can now be set forth.

Referring to FIGS. 3 and 4, mirror A of this invention is illustrated placed within a warping harness B. The purpose of warping harness B is to bend the mirror A about an axis 31. This causes the side edges 32, 33 of the mirror to be bent forwardly whereas the top and bottom edges 34 and 35 are bent rearwardly. The mirror is thus warped for off-axis use along axis 31 in a substantially toric shape. That is, the object and image areas would be separated (off-axis) along the direction 31 for the concave mirror shown in FIGS. 3 and 4.

Referring to FIGS. 3, 4 and 5, the construction of the warping harness can be readily understood. The mirror is gripped at 34, 35 by paired clamps 41, 42. Clamps 41, 42 have pressure points 43 on clamp 41, and 44 on clamp 42, which bear on the active optical surface of the mirror. Pressure points 43 overlie a warping rod 45 threaded through clamp 41 at an aperture 47. Similarly, and on the opposite edge 35, pressure points 44 overlie a warping rod 46 on the opposite side of the harness. Rods 45 and 46 extend to and within bars B at opposite ends of the harness. As will hereinafter be emphasized with respect to FIG. 4, warping rods 45, 46 together with bars B provide the necessary spring force to deform the mirror.

Referring to the detail of FIG. 5, a bar B is shown having a warping rod 46 keyed thereto. Warping rod 46 extends into one end of bar B and is typically fastened thereto by an Allen screw 47.

It is necessary that bar B be provided with a member which bears on the reverse side 20 of mirror A. According to this aspect of the invention, bar B is slotted at a slot 50 angularly disposed in anticipation of the warp and curvature on the reverse side of the mirror 20. Into this slot there is placed a bar 51 which is keyed at a key 52 interior of the block.

Bar 51 extends outwardly through an attached wedge 53 to hold a block 54 angularly disposed with respect to surface 20 of mirror A. Typically, block 54 is provided with a threaded aperture 55 which has an Allen bolt 56 placed in the end thereof. Allen bolt 56 is threaded so that turning of the Allen bolt advances and retards a pressure point 57 at the end of Allen bolt 56 bearing on the reverse side of the mirror 20.

A word about the respective pressure points should be made. Specifically, each of the pressure points is preferably located at 15° either side of the axis of bending of the mirror. That is to say, points 43 are each 15° off of the axis 31 for a total separation of 30°. Similarly, points 44 are each 15° off of the axis 31 for a total separation of 30°. Likewise, the pressure points 57 on each of the bars B are similarly located. Taking the axis 61 normal to the bars B, it will be found that each pressure point 57 is 15° off of axis 61. It has been found that this specific distribution of the pressure points provides for easily reproducible warping of the mirror A as mounted within the harness.

Once the mirror is placed within the harness, warping bars 45, 46 elastically deflect to produce the desired force on bars B. With the desired force on bars B, warping of mirror A occurs with the side edges 32, 33 being bent upwardly as shown in FIG. 4 and clamps 41, 42 pulling the top and bottom edges rearwardly.

It should be noted that warping bars 45, 46 are substantially deflected elongate members. This substantial deflection of an elongate member has been found highly desirable in that the stresses applied to the mirror tend to be uniform.

In intimate adjustment of the warping harness as here shown, Allen screw 56 at each of the bars B is typically turned to adjust the screws towards or away from surface 20 of the mirror. Such adjustment is made by reasonably remembering the turns applied to each Allen screw 56 and trying to apply an equal number of turns to each of the screws 56 to warp the mirror A.

As long as a substantial symmetry is maintained at each Allen screw 57, it has been found that the intimate and final adjustments of the mirror can be made with just a slight twisting of one Allen screw 56. The harness has the effect of applying over the entirety of the mirror a uniform force so long as one screw 56 is not completely out of line with the remaining screws 56. Uniform warping of the mirror occurs.

Referring to FIG. 6, a mirror mounted in a harness is shown mounted interior of three wheels 70. Wheels 70 extend at substantial 120° intervals about the periphery of a mounted mirror assembly. It is noted that while wheels 70 carry the weight of the mirror A, they provide no bending force to the mirror A.

It should be understood that either side of the mirror illustrated in FIG. 2 can be optically active. Moreover, the mirror could have two convex surfaces which, if confined to the parameters herein, could result in a mirror which could be warped in accordance with this invention. It is merely required that the parameters of mirror thickness and change of mirror thickness be conformed to, for a substantially spherical surface. It should be understood that the harness can be of any desired configuration other than the preferred configuration herein shown.

The particular mirror shown in FIG. 6 is mounted for use in an eye-testing apparatus. In this apparatus the patient views the mirror off-axis and has relayed to his eyes a prescription for optometric tests. It should be apparent that the warped mirror of this disclosure can be used in any number of different apparatus where a highly reproducible off-axis mirror is required. Likewise, modifications may be made without departing from the spirit and scope of this invention.

I claim:

1. A mirror for elastic warping comprising: a disk of elastically deformable glass with an active optical front surface on a side approximating a sphere; said sphere of said optical surface having a first and relatively large radius of curvature at least equal to or exceeding two and a half times the diameter of said mirror; said disk of glass having on the opposite and rear side thereof from said active optical surface a rough ground surface having a radius of curvature different than the radius of curvature of said active optical surface, said mirror having a thickness at its central point in the range of one fifth to one fifteenth of its diameter; and, the length of the radius of curvature of said opposite and rear side with respect to the length of the radius of curvature of said front surface being selected to produce a decrease in mirror thickness at the edges of said mirror in the range of 0.21 to 0.42 of the thickness of said mirror at said central point.

2. A mirror according to claim 1 and wherein said radius of curvature of said rear surface with respect to said front surface is selected to produce a decrease in mirror thickness at the edges of said mirror in the range of 0.27 to 0.39 of the thickness of said mirror at said central point.

3. A mirror according to claim 1 and wherein said radius of curvature of said rear surface with respect to said front surface is selected to produce a decrease in mirror thickness at the edges of said mirror in the amount of 0.33 of the thickness of said mirror at said central point.

4. A mirror according to claim 1 and wherein said curvature of said optically active surface does not depart from a spherical shape by more than one tenth of the change of thickness of said mirror between said central point and any point on said edges.

5. The invention of claim 1 and wherein said mirror has a thickness at its central point in the range of one tenth its diameter.

6. The invention of claim 1 and wherein said active optical surface is concave.

7. The mirror of claim 1 and where said active optical surface is convex.

8. In the combination of a mirror and an elastic warping harness mounted to said mirror for warping said mirror for off-axis use, the improvement in said mirror comprising: a disk of elastically deformable glass with an active optical front surface on a side approximating a sphere; said sphere of said optical surface having a first and relatively large radius of curvature at least equal to or exceeding two and a half times the diameter of said mirror; said disk of glass having on the opposite and rear side thereof from said active optical surface a rough ground surface having a radius of curvature different than the radius of curvature of said active optical surface, said mirror having a thickness at a central point in the range of one fifth of one fifteenth of its diameter; and, the radius of curvature of said opposite and rear side with respect to said front surface being selected to produce a decrease in mirror thickness at the edges of said mirror in the range of 0.21 to 0.42 of the thickness of said mirror at said central point.

9. A mirror according to claim 8 and wherein said radius of curvature of said rear surface with respect to said front surface is selected to produce a decrease in mirror thickness at the edges of said mirror in the range of 0.27 to 0.39 of the thickness of said mirror at said central point.

10. A mirror according to claim 8 and wherein said radius of curvature of said rear surface with respect to said front surface is selected to produce a decrease in mirror thickness at the edges of said mirror to be 0.33 of the thickness of said mirror of said central point.

11. The invention of claim 8 and wherein said mirror has a thickness at its central point of one tenth its diameter.

12. The invention of claim 8 and wherein said active optical surface is concave.

13. The invention of claim 8 and wherein said active optical surface is convex.

* * * * *